(12) United States Patent
Cortenraad et al.

(10) Patent No.: US 9,465,450 B2
(45) Date of Patent: Oct. 11, 2016

(54) METHOD OF CONTROLLING A SYSTEM

(75) Inventors: Hubertus Maria Rene Cortenraad, Maastricht (NL); Jan Kneissler, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 1680 days.

(21) Appl. No.: 11/993,514

(22) PCT Filed: Jun. 28, 2006

(86) PCT No.: PCT/IB2006/052149
§ 371 (c)(1),
(2), (4) Date: Dec. 21, 2007

(87) PCT Pub. No.: WO2007/004134
PCT Pub. Date: Jan. 11, 2007

(65) Prior Publication Data
US 2010/0079374 A1    Apr. 1, 2010

(30) Foreign Application Priority Data
Jun. 30, 2005    (EP) .................................... 05105973

(51) Int. Cl.
*G06F 3/033*    (2013.01)
*G06F 3/0346*    (2013.01)
(Continued)

(52) U.S. Cl.
CPC ........... *G06F 3/0346* (2013.01); *G06T 7/0044* (2013.01); *G06T 7/0046* (2013.01);
(Continued)

(58) Field of Classification Search
CPC . G06F 3/0346; G06T 7/0044; G06T 7/0046; H04N 7/163; H04N 21/42204; H04N 21/4223; H04N 21/43615; H04N 21/4532; H04N 21/4131; H04S 7/302
USPC .................................................. 345/158, 156
See application file for complete search history.

(56) References Cited

U.S. PATENT DOCUMENTS

| 5,856,844 A | 1/1999 | Batterman et al. |
| 6,118,880 A | 9/2000 | Kokkosoulis et al. |

(Continued)

FOREIGN PATENT DOCUMENTS

| DE | 10110979 A1 | 9/2002 |
| JP | 03247173 A | 11/1991 |

(Continued)

*Primary Examiner* — Priyank Shah

(57) ABSTRACT

The invention describes a method of controlling a system (1) comprising one or more components ($C_1, C_2, \ldots, C_n$), which method comprises the steps of aiming a pointing device (2) comprising a camera (3) in the direction of one or more of the components ($C_1, C_2, \ldots, C_n$), generating image data (4) of a target area A( ) aimed at by the pointing device (2), encompassing at least part of one or more of the components ($C_1, C_2, \ldots, Cn$), and analyzing the image data (4) to determine position information (P) pertaining to the position of the user (5) relative to one or more of the components ($C_1, C_2, \ldots, C_n$) at which the pointing device (2) is being aimed and/or to relative positions of the components. The system (1) is subsequently controlled according to the position information (P). Furthermore, the invention describes a corresponding control system (10), a home entertainment system, and a lighting system. The invention further describes a method of acquiring dimensional data (D) for use in the image data analysis.

15 Claims, 7 Drawing Sheets

(51) Int. Cl.
   *G06T 7/00*       (2006.01)
   *H04N 7/16*       (2011.01)
   *H04N 21/41*      (2011.01)
   *H04N 21/422*     (2011.01)
   *H04N 21/4223*    (2011.01)
   *H04N 21/436*     (2011.01)
   *H04N 21/45*      (2011.01)
   *H04S 7/00*       (2006.01)

(52) U.S. Cl.
   CPC ......... *H04N 7/163* (2013.01); *H04N 21/4131* (2013.01); *H04N 21/4223* (2013.01); *H04N 21/42204* (2013.01); *H04N 21/43615* (2013.01); *H04N 21/4532* (2013.01); *H04S 7/302* (2013.01)

(56) References Cited

U.S. PATENT DOCUMENTS

| | | | | |
|---|---|---|---|---|
| 6,256,033 | B1* | 7/2001 | Nguyen | ........................ 715/863 |
| 6,442,476 | B1* | 8/2002 | Poropat | ........................ 701/207 |
| 2002/0159611 | A1 | 10/2002 | Cromer et al. | |
| 2004/0048663 | A1* | 3/2004 | Cheng et al. | ................... 463/36 |
| 2004/0095317 | A1 | 5/2004 | Zhang et al. | |
| 2004/0156512 | A1* | 8/2004 | Parker | |
| 2004/0208588 | A1* | 10/2004 | Colmenarez | ........... G08C 19/28 398/115 |
| 2005/0025345 | A1 | 2/2005 | Ohta et al. | |
| 2006/0050052 | A1* | 3/2006 | Mekenkamp et al. | ........ 345/156 |
| 2007/0252721 | A1* | 11/2007 | Geurts | .................. G06F 3/0325 340/4.31 |
| 2007/0268392 | A1* | 11/2007 | Paalasmaa | .............. G01C 21/20 348/333.02 |
| 2008/0240474 | A1* | 10/2008 | Sakamoto | ................ H04R 5/02 381/300 |
| 2009/0295595 | A1* | 12/2009 | Thelen | ................... G08C 17/02 340/12.52 |
| 2010/0157033 | A1* | 6/2010 | Kneissler | ............... G06F 3/0346 348/61 |
| 2011/0095980 | A1* | 4/2011 | Sweetser | ............... G06F 3/0346 345/158 |

FOREIGN PATENT DOCUMENTS

| | | |
|---|---|---|
| JP | 2005050177 A | 2/2005 |
| WO | WO0060534 A1 | 10/2000 |
| WO | WO0241664 A2 | 5/2002 |
| WO | WO2004047011 A2 | 6/2004 |
| WO | WO2005062273 A1 | 7/2005 |

\* cited by examiner

METHOD OF CONTROLLING A SYSTEM

This invention relates to a method of controlling a system comprising one or more components, and to a control system for controlling such a system. Furthermore, the invention relates to a method of acquiring dimensional data for a component of such a system. The invention also relates to a home entertainment system and to a lighting system.

Home entertainment systems, as can be found in many homes today, often comprise components such as a television and a receiver or amplifier, as well as a number of loudspeakers, for example a set of surround speakers. Since homes are designed and decorated in any number of ways, and since the owners' tastes are also diverse, it may safely be generalised that almost every home entertainment system is setup differently, and that every user has different wishes or opinions as to what suits him with respect to his home entertainment system.

Some home entertainment systems allow personalisation, albeit to a limited extent. For example, U.S. Pat. No. 6,118,880 and patent application US 2002/0159611 A1 both suggest ways in which the sound output from the loudspeakers of a surround sound system can be adjusted to suit the user's position while seated within the group of loudspeakers. In both of the proposed methods, the user must carry out a calibration procedure in which test signals are transmitted from a dedicated hand-held device and detected by appropriate circuitry in the loudspeaker housings. The distances between the loudspeakers and the user are deduced after processing the detected test signals. The distances thus measured can then be applied to configure the sound channels so that the loudspeaker output suits the user's position. Obvious disadvantages of such systems are that the loudspeakers must be equipped with specialised circuitry for the personalisation to be carried out, and that such a system can only be applied to personalising one element of the home entertainment system, in this case only the loudspeakers.

Furthermore, the remote control used for calibration of the system, and the remote control(s) generally used for control of components of the system—such as television, tuner, DVD player, etc.—can be cumbersome and award to use, particularly when there are a number of components in the system, and each must be controlled by its own remote control. Under these circumstances, the user must often acquaint himself with a great variety of buttons, often with non-intuitive names, for selecting or activating an ever-increasing number of functions. Ultimately, a user can become confused or exasperated by the difficulty involved in accessing the more obscure features of the components, so that he might eventually just give up and resign himself to using a restricted number of features with which he is already familiar.

A possible alternative to the usual remote control may be a pointing device. A user interface system based on a pointing device is known from WO 2004/047011 A2 which disclosure is herewith included by reference. The concept of such a system is that a pointing device connected to a camera can be used to control any device in its surroundings by being aimed at an object, e.g. a housing of the device, a screen, or any other application or accessory associated with the device. The camera of the pointing device generates images of the target area at which it is being aimed, and these images are subsequently analysed. Such a pointing device can be used to control a component of a system by pointing at, for example, the display of the component upon which might be shown a number of options, in order to select one of the options. In this way, a user can configure one or more components of a system to suit his requirements.

However, regardless which type of device is used to configure the components of a system, the configuration must be repeated whenever the user changes his position. For example, he might like to sit in one place when enjoying a movie with surround sound, but might prefer to sit in a different place when listening to music or radio. In each case, he must re-configure the loudspeakers so that the balance suits his position. If he moves away from the system, for instance, into an adjoining room or space, but wishes to continue listening to, for example, a radio program, he must manually adjust the volume so that he can continue to hear. Evidently, such continual adjustments, where the user must specifically select a function (volume control, balance etc.) of a remote control, or invoke an option on a component display for selection with a pointing device, will ultimately be perceived as awkward and irritating.

Therefore, an object of the present invention is to provide an easy and intuitive way for a user to configure any component of a system to suit his current position.

To this end, the present invention provides a method of controlling a system comprising one or more components, which method comprises the steps of aiming a pointing device comprising a camera in the direction of one or more of the components and generating image data of a target area aimed at by the pointing device, encompassing at least part of one or more of the components. Thereafter, the image data is analysed to determine position information pertaining to the position of the user relative to one or more of the components at which the pointing device is being aimed and/or to relative positions of the components. Subsequently, the system, i.e. one or more components of the system, is controlled or configured according to the position information.

The components of a system might be any of the usual components of a typical home entertainment system, such as a television, DVD, amplifier, loudspeakers, etc., or might be any other type of electrically controllable component such as switches for lighting fixtures, controllers for curtains or window shutters, etc.

The position information obtained by analysing the images of one or more component can describe parameters of the relative position between the user and a component, such as his distance from a component, or the angle at which he is positioned with respect to the component, while aiming the pointing device at the component. Furthermore, analysis of the target area images can yield position information describing the position of one component of the system relative to another component.

A control system for controlling a system comprising one or more components comprises a pointing device for interacting with the system, which pointing device comprises a camera for generating image data of a target area at which the pointing device is aimed, an image analysis unit for analysing the image data to determine position information pertaining to the position of the user relative to one or more of the components at which the pointing device is being aimed, and/or to relative positions of the components, and a control unit for controlling the system, i.e. one or more system components, according to the position information.

An obvious advantage of the invention is that the user does not need to carry out complicated interactive procedures in order to adjust components of the system to suit his position. By simply aiming the pointing device at a component of the system, he informs the system of his new position, and individual components of the system can then be controlled or adjusted accordingly. Components of the system can therefore be adjusted at intervals or even continually in a type of "follow me" mode. For example, the user need only briefly aim the pointing device at the television from his new position in order to have the volume of the television loudspeakers or the surround loudspeakers to automatically adjust to his separation from it. For example, as he moves closer, the volume of the television loudspeakers can decrease, or they can increase as he moves away, so that the volume is continually adjusted to follow his position.

The dependent claims and the subsequent description disclose particularly advantageous embodiments and features of the invention.

In the analysis of the image data to determine the position information, the component at which the pointing device is being aimed is first identified. A component appearing partially or completely in the target area image can be identified in a number of ways which will be known to a person skilled in the art. Known image processing techniques can be applied to extract particular image data such as corner points of the component in the image, or relevant areas of the image. The data thus extracted can then be, for example, compared to templates of the system components. The component template most closely matching the image data would thus identify the component being aimed at. Alternatively, for example in the case of the system components all having sufficiently different proportions, it might suffice to identify corner points of the component in the image, and therefore "image dimensions" of the component (e.g. in pixels), and to compare these proportions of the image dimensions with the length, breadth, height etc. of the dimensions of a number of available component models, such as three-dimensional models, wire-frame models, etc. The component model with the most closely matching proportions would be chosen.

In another way of component identification, some or all of the components might be provided with identification markers of some kind. For example, a marker in the form of a sticker with a distinct shape can be applied to the front of a component, so that the marker will appear in the image when the pointing device is aimed the component. Naturally, such a sticker can be of a material which can be registered optically by a digital camera equipped with a suitable detector, while being essentially invisible to human eye. The shape of the marker and/or its position on the housing of the component might exclusively identify the component, and appropriate descriptive information can be retrieved by the image analysis unit in the image processing procedure.

Once the component has been identified, the image analysis can then, according to the invention, proceed to determine the separation or distance between the component and the pointing device. To arrive at this distance, the actual dimensions of the component must be known so that the image data can be correctly interpreted. Therefore, in a preferred embodiment of the invention, information pertaining to the component extracted from the image is compared to known dimensional data describing that component. The dimensional data for a component can be retrieved from, for example, a three-dimensional model, a wire-frame model, or any other suitable type of model describing that component. The model for a component gives the actual sizes or dimensions of the component. Therefore, dimensional data for a component such as a CD player might comprise the dimensions of the housing, such as width, breadth, height, etc., and might also give the positions and shapes of distinctive features such as the positions and outlines of a display, volume control knob, CD drawer, etc.

Dimensional data pertaining to the camera of the pointing device, such as the focal length of the camera, are also preferably applied in analysing the image data. Thus, knowing the focal length of the camera, the actual dimensions of the component, and the dimensions of the component as seen in the image, it is possible to easily determine the distance between the camera of the pointing device and the component at which the pointing device is being aimed, and therefore also the distance between the user and the component. Since the user will generally hold the pointing device in his hand, the control system may assume that the length of the user's lower arm from hand to elbow is of average length in order to compute the actual user's position. Alternatively, the control system may allow the user to enter the length of his lower arm as a parameter for the image analysis, thus allowing a more accurate distance measurement.

One possible way of obtaining a model for a component might be that the user create a model himself by means of, for example, a suitable software program, into which he might enter details describing the component's dimensions. Alternatively, the user might enter image data such as might be contained in one or more photographs of the device taken with a digital camera. The model generated in this way could then be communicated to the image analysis unit of the control system.

However, such methods of acquiring dimensional data for one or more components can be time-consuming. Therefore, in a preferred embodiment of the invention, dimensional data for a component of a system can be obtained more easily in a training procedure using the pointing device. To this end, a method of acquiring dimensional data according to the invention comprises the steps of aiming the pointing device at a component and generating an image, or sequence of images, of the component to derive dimensional data for that component. For instance, the dimensional data newly derived in this way might comprise the distances between salient points of the component in the image, such as corner points of the housing of the component, and which, knowing the focal length of the camera, can be translated into a crude "wire model" for the device. Furthermore, in the case that dimensional data in the form of a model already exists for this component, this initial dimensional data for the component can subsequently be updated and improved using the newly derived dimensional data.

Some amount of user interaction might be required for carrying out the training procedure. For example, if there are no initial dimensional data available for a component, the image analysis unit must preferably, at least for a number of initial measurements, know the distance between the pointing device and the component for which a model is to be trained. To this end, the training procedure can be carried out in a "supervised" manner, by issuing appropriate instructions to the user. For example, the user might first be instructed to stand in front of the component, so that he is holding the pointing device at a distance of, say, two meters from the component. An image is then generated of the component from this distance. The user can then be instructed to stand two meters to the left of the component at a particular angle, then two meters to the right of the component at a particular angle, etc., while an image is generated for each position. The instructions might be issued by means of a loudspeaker of the system, or might appear on a display of the system. Then, knowing the distance between the pointing device and the component for each image, and knowing the focal length of the camera of the pointing device, the image analysis unit can easily deduce the dimensions of the component, so that these can subsequently be used as input parameters to a training unit for training a model of the component.

The supervised training procedure described above can suffice to obtain a rough or initial model with, preferably, important dimensions of the component such as the dimensions of its housing. Thereafter, the initial model can be updated without any user participation in an unsupervised training procedure, which takes advantage of the fact that the user will, in any case, be aiming the pointing device at various components in order to interact with them. Whenever the user aims the pointing device at a component, the image analysis unit can use image data—which is also being used for controlling the component—to derive new dimensional data which can be input to the training unit in order to further update or refine the model for the component. In this way, the model of a component can be refined over time so that the performance of the system can be improved, for example by reducing the time taken to calculate the user's position from a component, and therefore reducing the time required to react to a change in the user's position.

Evidently, a model of a component can also be supplied by the manufacturer of the component, or by a third party, and might be obtained when the component is purchased, or at a later date, and be transferred in some suitable way to the image analysis and/or training unit. For example, a three-dimensional or other type of descriptive model for a component could be downloaded from a network such as the internet.

The control system according to the invention preferably comprises a training unit and/or a data acquisition unit. Such a training unit can issue the commands required for a supervised training procedure, or might simply communicate with the image analysis unit, without any user participation, in order to obtain image analysis results suitable for adapting component models. A data acquisition unit can acquire component models—or dimensional data—from any appropriate source, and might therefore be provided with one or more suitable interfaces. A source of models might, as already mentioned, be the manufacturer, the internet, or a graphics program.

Evidently, the method of controlling a system, according to the invention, can be applied in a number of practical and interesting ways to make the interaction with a system easier and more convenient for the user. For example, the method can be used to adjust the size of text or images in a display of one of the system components to suit the user who is reading the display. If the user is standing close to the display, the text can be shown in the usual size. When the user moves away from the component and aims the pointing device at the component to allow the control system to determine his new position with respect to the component, the size of the text and/or images in the display can be increased so that the user can easily read or interpret that which is shown in the display. In this way, the method according to the invention ensures that the user can comfortably see what is shown in the display at any reasonable distance.

Another application of the method and control system according to the invention can be used to determine the relative positions of a number of system components, or the positions of a number of components relative to a user, and to use this information to control or configure the components. In one approach, the constellation of, say, a group of loudspeakers can be made known to the system, for example by entering in some way the distances between each of the loudspeakers. Then, whenever the user aims the pointing device at one of the loudspeakers, and this loudspeaker is identified in image analysis, the position of the user with respect to this loudspeaker can be determined, and therefore also his position with respect to the other loudspeakers. The sound channel inputs to the loudspeakers can then be adapted to suit the position of the user, for example to position the sweet spot at his location.

Of course, the relative positions of the components of a system can also be determined automatically by using the pointing device, without requiring the user to physically measure the components himself and to enter these measurements to the control system. In one approach, perhaps with instructions being issued by the control system, the user aims the pointing device at the components so that at least two components are at least partially visible in the target area image. Using the models of the identified components, the image analysis can deduce the distance between the components. The process can be repeated for all desired components, thus making it possible to determine the overall constellation of the components. The distances between components can also be calculated in the background, without any user participation, by analysing any image in which more than one component is visible whenever the user is aiming the pointing device at a component in order to interact with it. In this way, information pertaining to the distances between components can be collected and analysed in the background, and then used in controlling or configuring one or more components.

In the case of a group of loudspeakers, the sound channels input to the loudspeakers can be subsequently automatically adjusted when the user changes his position within the group of loudspeakers, or if he moves out of the group. For example, the user might move into an adjoining area or room, but still want to hear what is being played on the radio or television. In this case, he need only briefly aim the pointing device at one of the components of the system for the volume of the relevant loudspeakers to be increased to "follow" the user. As the user once again approaches the loudspeakers, briefly aiming the pointing device at one of the components, the control system automatically decreases the volume of the speakers again.

Naturally, the system components with which the method can be used are not limited to electronic audio-visual components such as television, loudspeakers, etc. The system can also comprise elements such as lighting, electronically controlled window blinds or curtains, etc. It is conceivable that a number of such elements and components are all controllable by one control system. For example, the user might seat himself to watch a movie, and aim the pointing device in the direction of the television or DVD player to issue the appropriate commands. After interpretation of the commands by the control system, the curtains or blinds might automatically close, and the lighting can be automatically turned on and/or dimmed. For example, overhead lighting might be switched off and a reading light, or other light suitable for a television viewing situation, can be turned on at an appropriate brightness level.

In a method for control of a system according to the invention, the pointing device with the camera can be aimed in the direction of a component, upon which is presented a number of "options", in order to interact with the component. Subsequently—as explained above—an image of a target area aimed at by the pointing device is generated, and the target area image is processed to determine the target point at which the pointing device is aimed. The chosen option is determined depending on the position of the target point on the component. An option might be a menu item displayed on a display, such as a television screen, or a button or knob on the front of a component, e.g. a fast-forward button on a DVD player. Aiming the pointing device at the option allows the user to easily select the option.

To determine the target point in the target area image, computer vision algorithms can be applied. A method of processing the image data of the target area image using computer vision algorithms might comprise detecting distinctive points in the target image data, determining corresponding points in a template of the component, e.g. the screen, of the device or in the (known) surroundings of the component, and developing a transformation for mapping the points in the image data to the corresponding points in the template. This transformation can then be used to determine the position and aspect of the pointing device relative to the component, so that the point of intersection of the pointing axis with the component can be located in the template. The position of this intersection in the template corresponds to the target point in the component at which the user is aiming the pointing device, and which can be used to easily identify which option has been targeted by the user. Comparing the image data with the pre-defined template may thereby be restricted to identifying and comparing only salient points such as distinctive corner points. The term "comparing", as applicable in this invention, is to be understood in a broad sense, i.e. by only comparing sufficient features in order to quickly identify the option at which the user is aiming.

In a particularly preferred embodiment of the invention, the processing of the target area images to identify the target point might be carried out within the pointing device itself. However, the computing power of such a pointing device, which is preferably realized to be held comfortably in the hand, is necessarily limited by the power required by complicated computing processes. Therefore, the image data are preferably transmitted for further processing to a component control interface. The component control interface receives image data from the pointing device, performs image analysis in an image analysis unit, and interprets the results of the image analysis in a control unit to generate control signals for the system or components of the system. The control unit can therefore send an appropriate control signal to the component on the basis of an option selected by the user, or on the basis of his distance from the component. Besides performing image analysis, the component control interface is also responsible for acquisition of dimensional data and/or model training.

Such a component control interface may be, for example, part of a component of the system to be controlled, and may be incorporated in the same casing as the component itself. Alternatively, this component control interface may be realised as a separate entity which can communicate in any appropriate manner with the component to be controlled, whereby such a component control interface may be capable of communicating with more than one component in the system, and with more than one system or type of system. Naturally, it is even conceivable that the component control interface will be incorporated in the pointing device, but, as long as the dimensions of the necessary components are too large to be incorporated in a hand-held device, the component control interface is preferably realised as a separate entity.

The pointing device and control system described in the above combine to give a powerful means for controlling practically any kind of system, for use in various kinds of environment, such as a home, office, museum, hospital or hotel environment. The method according to the invention can be applied to any electrically or electronically controllable component of a system. Furthermore, the control system and the system component being controlled can comprise any number of modules, components or units, and can be distributed in any manner.

Other objects and features of the present invention will become apparent from the following detailed descriptions considered in conjunction with the accompanying drawing. It is to be understood, however, that the drawings are designed solely for the purposes of illustration and not as a definition of the limits of the invention.

In the drawings, like numbers refer to like objects throughout.

Figure 1:
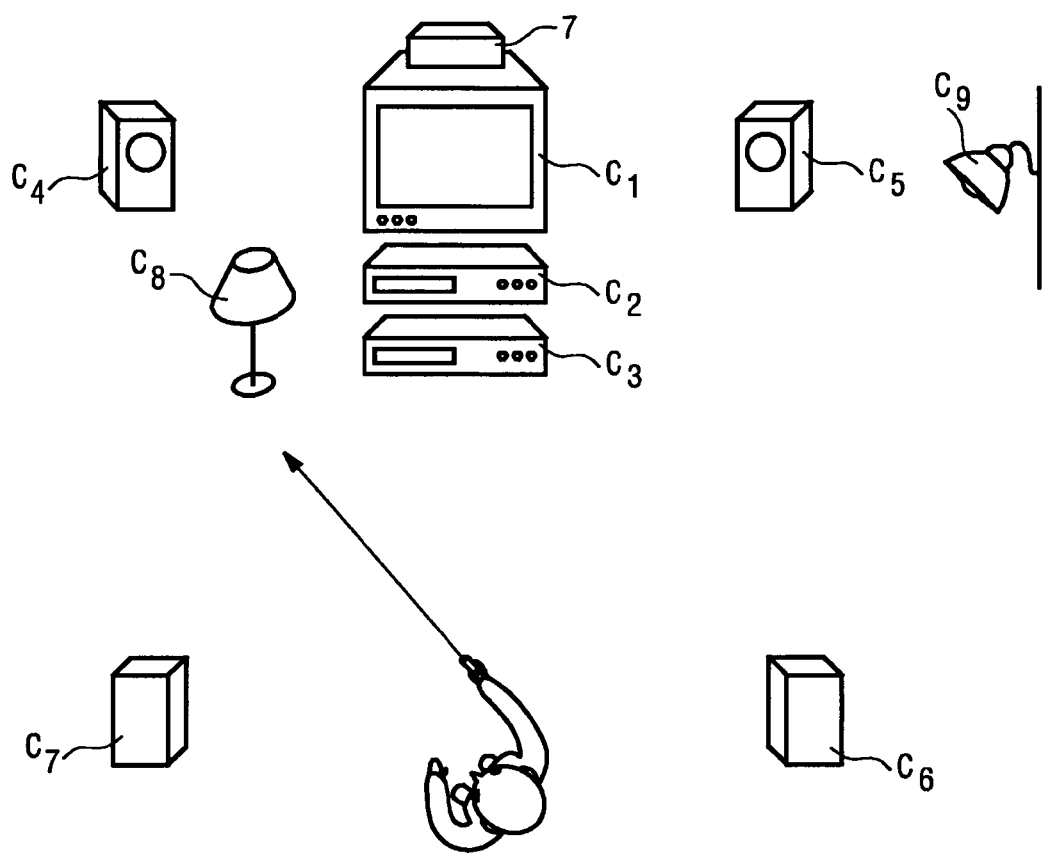
FIG. 1 is a schematic representation of a system comprising a number of components according to an embodiment of the invention.

FIG. 1 shows a system comprising a number of components, here a television $C_1$, a CD or DVD player $C_2$, an amplifier and tuner $C_3$, a number of loudspeakers $C_4, C_5, C_6, C_7$, and a number of lamps $C_8, C_9$, as might be found in any modern living room. A user 5 can aim a pointing device 2 comprising a camera at any of the components $C_1, C_2, C_3, C_4, C_5, C_6, C_7, C_8, C_9$ in order to interact with or control the component. A component control interface 7 according to the invention can be positioned at any suitable position, here it is shown together with the other components $C_1, C_2, C_3$. Images generated by the camera of the pointing device 2 are sent to the component control interface 7 and analysed. Position information regarding the user 5 and/or information pertaining to any option that the user 5 might have selected for the component $C_1, C_2, C_3, C_4, C_5, C_6, C_7, C_8, C_9$ at which he is aiming can be converted by the component control interface 7 into an appropriate control signal which is then forwarded to the relevant component(s) $C_1, C_2, C_3, C_4, C_5, C_6, C_7, C_8, C_9$.

Figure 2A:
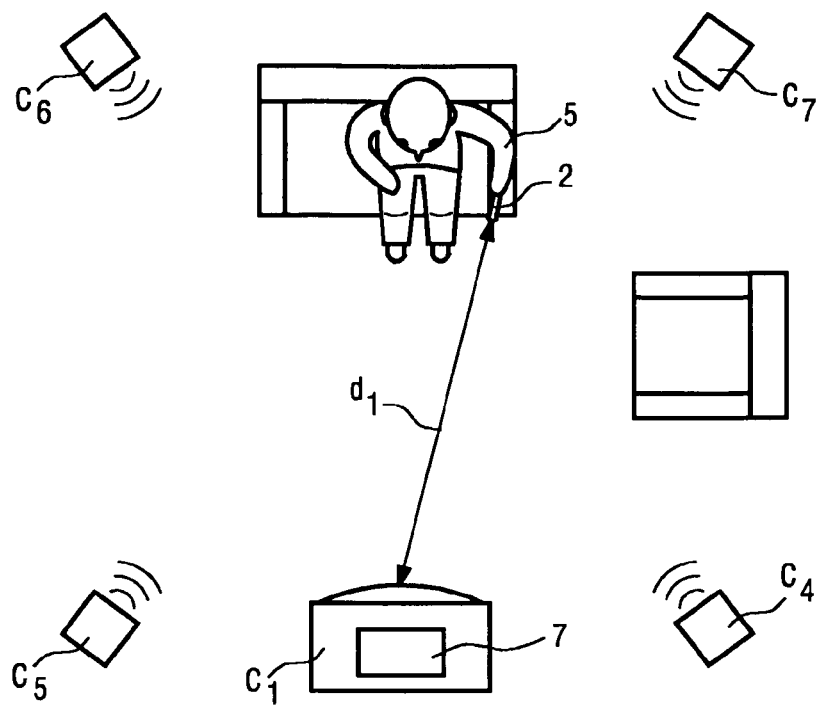
FIG. 2a shows the user at a first position relative to a component of a system.
Figure 2B:
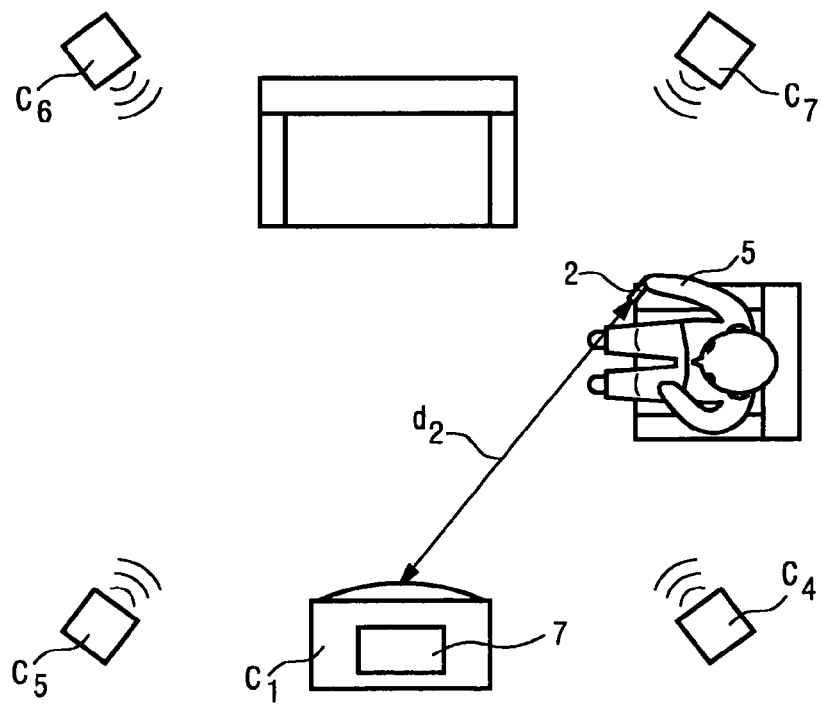
FIG. 2b shows the user at a second position relative to a component of a system.
Figure 2C:
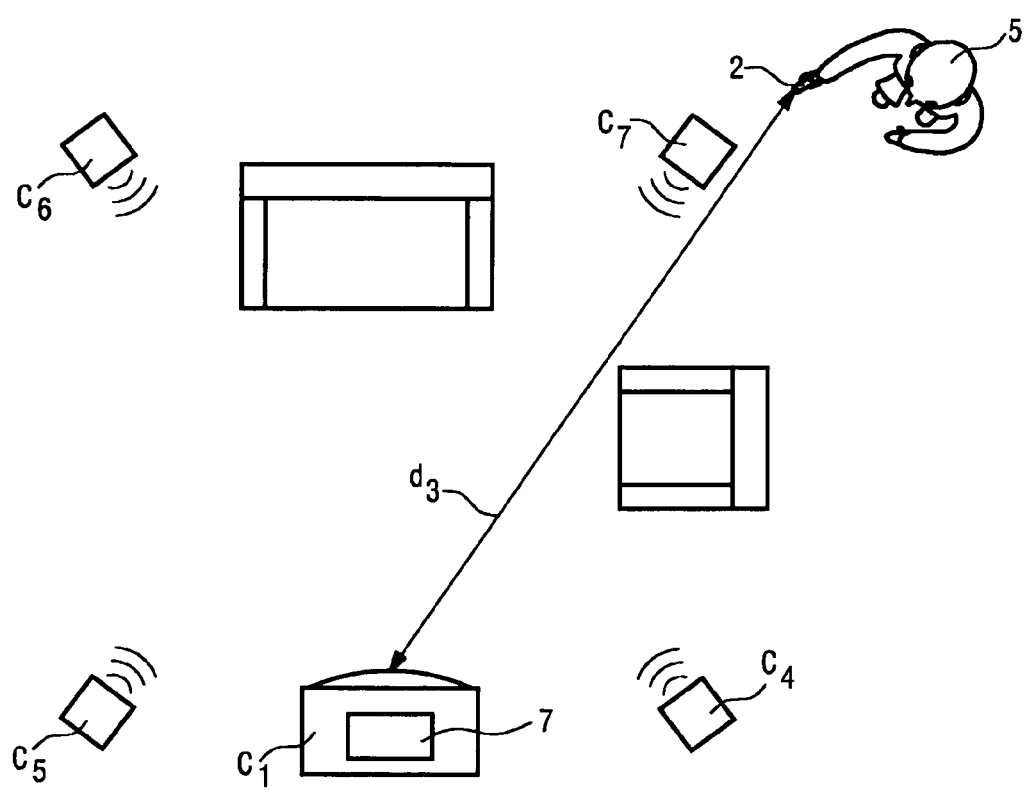
FIG. 2c shows the user at a third position relative to a component of a system.

FIGS. 2a-2c show the user in a number of positions relative to the television $C_1$. In FIG. 2a, the user 5 is seated on the sofa in front of the television $C_1$, so that he can watch a movie with surround sound. He can aim the pointing device 2 at the television $C_1$ or DVD player (not shown in the diagram). The control unit of the component control interface 7 can interpret the user's commands (e.g. "play DVD") and determine the distance $d_1$ between the user 5 and the television $C_1$, and automatically activate the surround sound system accordingly so that the loudspeakers $C_4$, $C_5$, $C_6$, $C_7$ deliver surround sound for the user 5 at his position. In FIG. 2b, the user 5 is seated in an armchair and wishes to listen to radio or music. He can issue appropriate control commands to the CD player or tuner ("play CD", "change stations") from where he is seated. At the same time, the distance $d_2$ between the user 5 and the component at which he is aiming is determined by the component control interface 7, and the loudspeakers $C_4$, $C_5$, $C_6$, $C_7$ are configured so that the volume of the loudspeakers $C_4$, $C_7$ closest to the user 5 is decreased, and the volume of the loudspeakers $C_5$, $C_6$ further away from the user is increased. In FIG. 2c, the user 5 leaves the area defined by the group of loudspeakers $C_4$, $C_5$, $C_6$, $C_7$, but still wishes to clearly hear the music, TV or radio program currently playing. Therefore, he briefly aims the pointing device 2 at the television $C_1$, so that the distance $d_3$ between him and the television $C_1$ can be determined. Subsequently, the component control interface 7 adjusts the volume of the loudspeakers $C_4$, $C_5$, $C_6$, $C_7$ so that the volume is loud enough for the user 5 to hear from his new position.

Figure 3:
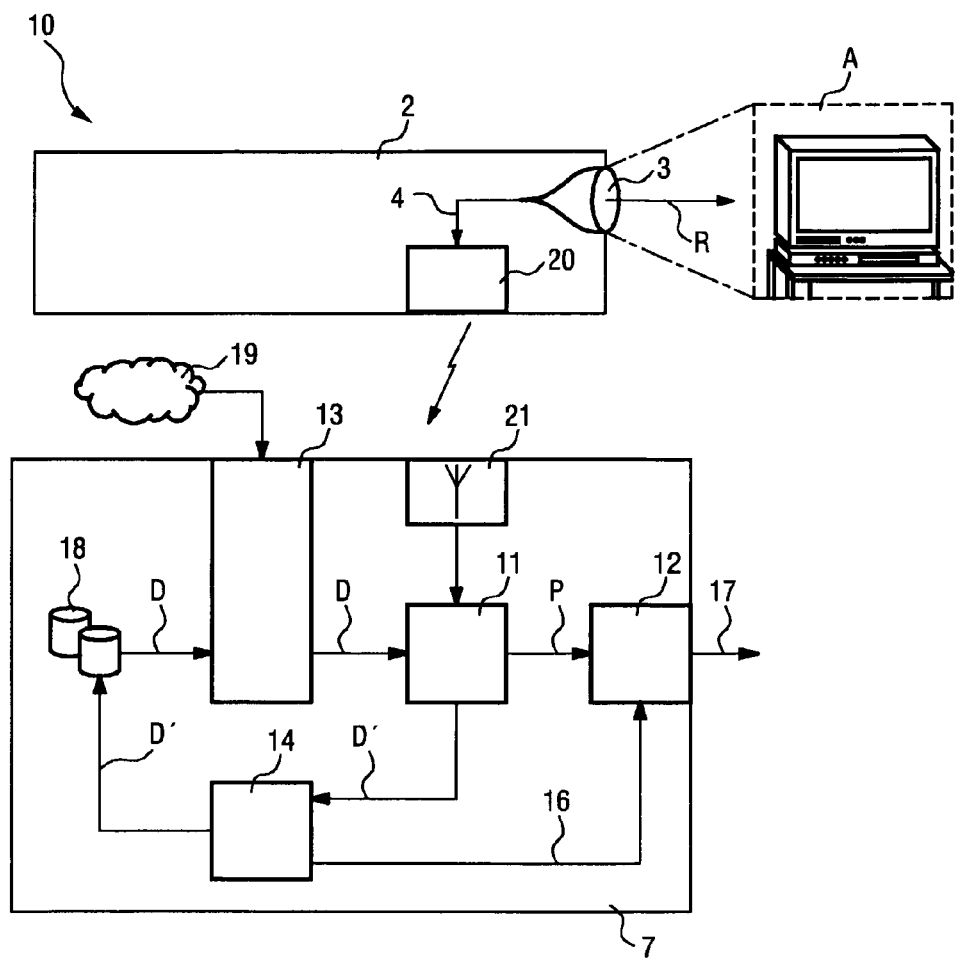
FIG. 3 shows a block diagram of a pointing device and a component control interface according to an embodiment of the invention.

In FIG. 3, the units and modules of the pointing device 2 and the component control interface 7, necessary for the method according to the invention, are shown in a block diagram. A camera 3 is incorporated in the pointing device 2, towards the front, and can generate image data 4 of the target area A in front of the pointing device 2 and in the direction of pointing R. Such a target area A is shown—schematically—to partially include a number of components. The target area image A in the form of image data 4 is transmitted via a transmitter 20 to a receiver 21 of the component control interface 7 and forwarded to an image analysis unit 11.

The image analysis unit 11 performs an initial image processing to identify the component(s) appearing in the image data 4. To determine the distance between the pointing device 2 and the component(s) at which the pointing device 2 is being aimed, the image analysis unit 11 can retrieve available dimensional data D for the components, in the form of suitable component models, from an acquisition unit 13. The acquisition unit 13 can, in turn, have obtained the dimensional data D from an external source 19 such as the internet or the manufacturer, or it might retrieve the dimensional data D from an internal memory or database 18. Other information or dimensional data D stored in the internal memory 18 might describe the positions of the components relative to each other, so that the overall constellation of the system components is known.

On the basis of the available models, the image analysis unit 11 can then determine position information P pertaining to the position of the pointing device 2 relative to the component at which the pointing device 2 is being aimed, whenever the user changes his position with respect to the component. This position information P, which might simply be a distance measurement, is forwarded to a control unit 12, which issues an appropriate control signal 17 to the system to be controlled or to the component at which the pointing device 2 is being aimed, or to another component. For example, the user might have aimed the pointing device 2 at a television, whereas, to compensate for his new position, it is the volume of the surround loudspeakers that needs to be adjusted. In this case, after determining the position of the pointing device 2, and therefore of the user, relative to the television, and knowing the position of the loudspeakers with respect to the television, the appropriate control signal 17 can be sent from the control unit 12 to the amplifier connected to the loudspeakers.

The dimensional data D stored in the internal memory 18 can be built up in a training procedure. For example, for a new component to the system or for a component for which no model is available, a training unit 14 of the pointing device 2 can guide the user through a training procedure in which a sequence of target area images A are generated. The resulting image data 4 are analysed in the image analysis unit 11 to give new model information D' for the component. Alternatively, additional dimensional data can be gathered to refine or update an existing model. In both cases, the new model information D' is added to the database 18 for future use. To inform the user what to do in the case of a supervised training procedure, the training unit 14 can compile training commands 16 for visual output on a screen or audio output from a loudspeaker, which are converted by the control unit 12 into the appropriate control signal 17 for the corresponding device (television, loudspeaker, etc.). Equally, the training procedure can run unsupervised in the background, so that the user does not have to participate in the acquisition of new dimensional data. Here, the image data 4 collected by the pointing device 2 in the course of user interaction with one or more components is simply processed in the background to collect new dimensional data to refine the existing models available for the components of the system. The training procedure is dealt with in more detail in FIG. 6.

Figure 4A:
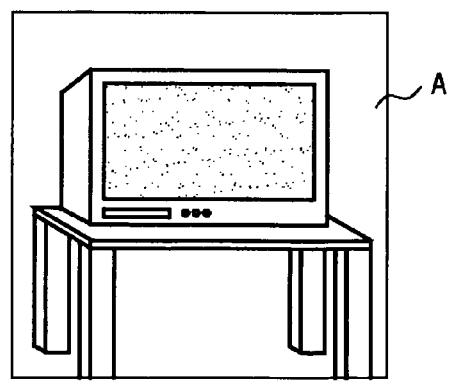
FIG. 4a shows a target area image of a component as seen from the left.
Figure 4B:
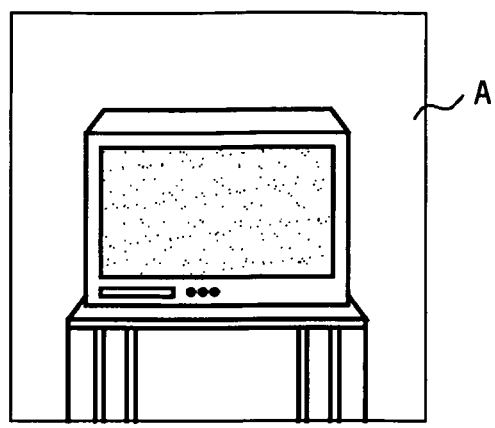
FIG. 4b shows a target area image of a component as seen from in front.
Figure 4C:
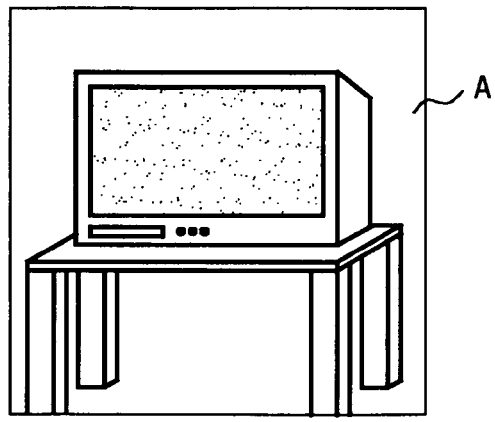
FIG. 4c shows a target area image of a component as seen from the right.
Figure 4D:
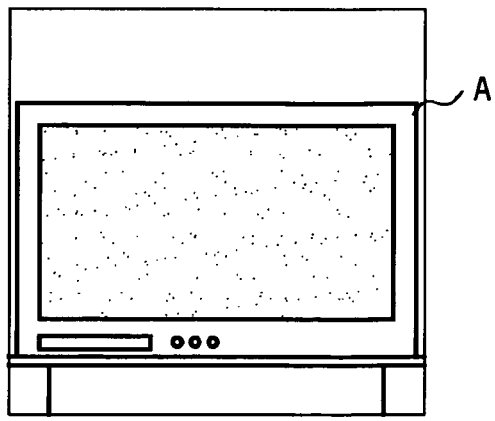
FIG. 4d shows a target area image of a component as seen from in front and close up.

To illustrate the different ways in which an object or component can appear in a target area image A, FIGS. 4a-4d show a component—in this case a television—from four different aspects. FIG. 4a shows the television as it appears in the target area image A when the user aims the pointing device at the television from the left and at a distance. FIGS. 4b and 4c show the same television as it appears in the target area image A from the front and from the right, respectively. In FIG. 4d, the user has aimed the pointing device at the television from the front, but was standing closer to the television, so that the television in this target area image A appears much larger than in the target area images of FIGS. 4a-4c. These diagrams also illustrate the different perspective effects which must be taken into consideration by the image analysis, for example in the identification of the component using the dimensional data or models for the components of the system.

Figure 5:
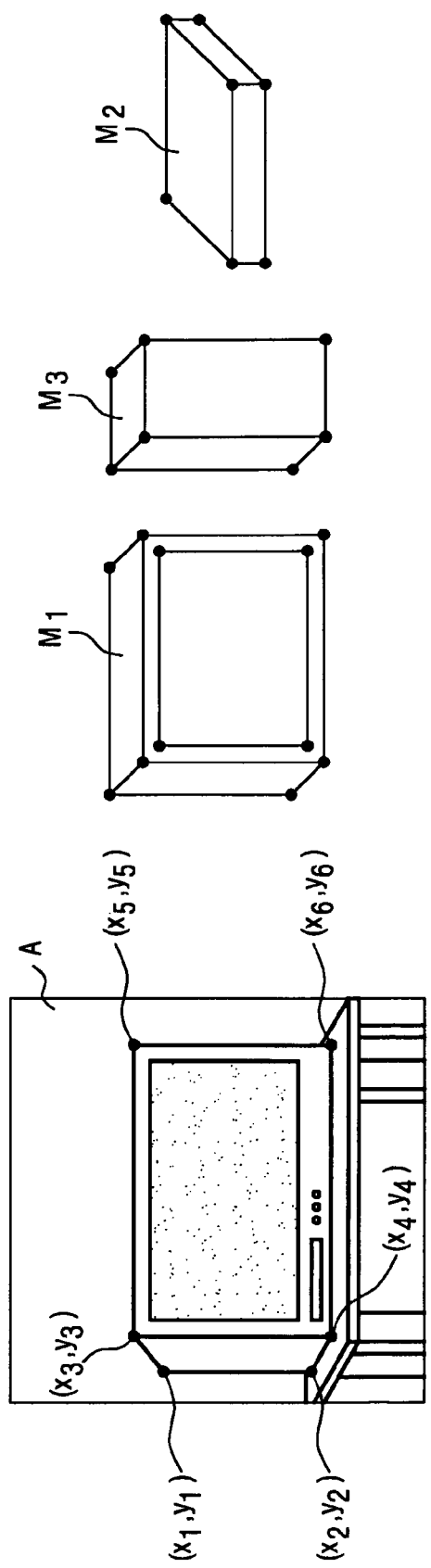
FIG. 5 shows points of interest in a target area image of a component.

The steps in the image analysis which are followed to determine the distance of the user from the component are described with the aid of FIG. 5. Here, image data in the form of a target area image A is shown for a television at which the user has aimed the pointing device. In a first image processing step, relevant points $(x_1,y_1), \ldots (x_6,y_6)$, corresponding to the visible corners of the television, are identified in the image data of the target area image A. In a next step, the image analysis unit of the component control interface identifies the component appearing in the target area image A. Naturally, the identification can be carried out by comparing the image data 4 with templates of the components and their surroundings, as described above, but for the purposes of illustration, in this example it is assumed that the identification is carried out using the models $M_1$, $M_2$, $M_3$ of the components available to the component control interface. Using the identified corner points, the image analysis unit can deduce the proportions of the visible sides of the component, given by the pair-wise distances between the point pairs $(x_1,y_1)$ and $(x_2,y_2)$, $(x_3,y_3)$ and $(x_4,y_4)$, $(x_5,y_5)$ and $(x_6, y_6)$, and so on. The image analysis unit can then compare these proportions with the proportions of the available models $M_1$, $M_2$, $M_3$. The comparison yields that the model $M_1$ most closely matches the component visible in the target area image 4. Relevant information pertaining to this model $M_1$ is retrieved, such as the function of the component in the overall system, its position relative to other components of the system, available commands for this component, etc. Subsequently, the image analysis unit of the component control interface can determine, on the basis of the dimensional data described by the model $M_1$ for this component and dimensional data for the camera of the pointing device—i.e. the focal length of the pointing device—the actual distance between the camera (and therefore the pointing device and the user) and the component. Using this information, the component control interface can generate a suitable control signal to that component or to another component, as necessary.

Figure 6:
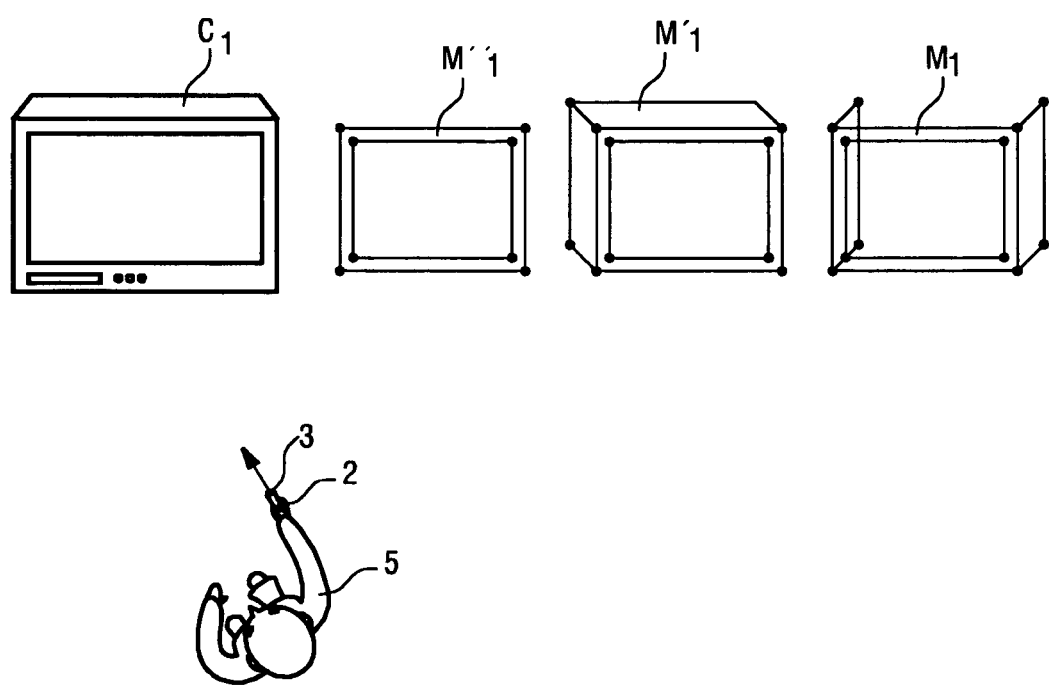
FIG. 6 is a schematic representation of a training process to train a model for a component of a system.

FIG. 6 illustrates, in an outline schematic manner, the training process which is carried out to train a model $M_1$ of a component $C_1$. Such a training process can run in the background while the user 5 is interacting with the component $C_1$ by means of the pointing device 2, or it may run in a supervised mode, with the user 5 receiving instructions as to where to stand with respect to the component $C_1$ while aiming the pointing device 2 at the component $C_1$. For the purposes of illustration, this example describes a supervised training procedure to derive a model $M_1$ for a television $C_1$.

In a first step, the user is instructed to stand in front of the component at a certain distance. A target area image is generated by the camera of the pointing device 2, and this image is analysed to extract relevant points. Here, the corner points of the housing and screen of the television are identified. Knowing the focal length of the camera of the pointing device 2, and assuming that the user 5 has positioned himself at the requested distance from the television $C_1$, the image analysis unit of the control system can deduce the dimensions of the front of the television $C_1$. These are used to create a first-level model $M_1''$.

The user is then requested to stand to the left of the television $C_1$ so that a second target area image can be generated, showing the television $C_1$ from this aspect. Again, image analysis is performed on the target area image to yield additional dimensional data which is used to refine the existing model $M_1''$, giving a second-level model $M_1'$. In a third step, the user 5 stands to the right of the television $C_1$ and aims the pointing device 2 at it to generate a third target area image, which is in turn analysed so that the existing model $M_1'$ can be further refined to give a complete model $M_1$ for this component $C_1$.

The process of generating a model has been explained above in a greatly simplified manner. However, it is more likely that a greater number of images is required to build a robust model for a component.

Although the present invention has been disclosed in the form of preferred embodiments and variations thereon, it will be understood that numerous additional modifications and variations could be made thereto without departing from the scope of the invention. For example, for a pointing device used by a number of users, each of these might be able to communicate, in some suitable manner, his own personalised settings for the components of the system. Then, for example, a user need only indicate that he is the current user of the pointing device for his personalised setting to be activated. A personal setting might be, for example, the measured length between the user's hand and his elbow, so that this distance, which might vary between users of the same pointing device, can be taken into consideration when determining the distance of the user from a component.

For the sake of clarity, it is also to be understood that the use of "a" or "an" throughout this application does not exclude a plurality, and "comprising" does not exclude other steps or elements. A "unit" may comprise a number of blocks or devices, unless explicitly described as a single entity.

The invention claimed is:

1. A method of controlling a component system depending on the position of a user relative to at least two components from among a plurality of components in the component system at which a pointing device comprising a camera is being aimed, the method comprising:
   aiming by the user of a pointing device at a target area containing at least part of the at least two components of a component system comprising a plurality of components;
   generating image data representing the target area at which the pointing device is being aimed;
   analysing the image data to identify the at least two components appearing partially or completely in the target area at which the pointing device is being aimed;
   analysing the image data to determine position information pertaining to a position of the user relative to the at least two identified components and/or relative positions of the components appearing partially or completely in the target area at which the pointing device is being aimed; and
   controlling the component system according to the user position information.

2. The method according to claim 1 where analysing the image data to determine the user position information comprises application of known dimensional data (D) pertaining to the at least two identified components.

3. The method according to claim 2 comprising:
   aiming the pointing device at the at least two components;
   generating image data representing the at least two identified components;
   analysing the image data to derive dimensional data (D') for the at least two components;
   updating the known dimensional data (D) for the at least two identified components according to the dimensional data (D') derived from the image analysis.

4. The method according to claim 3 where the dimensional data (D) for the at least two identified components is updated in a supervised training procedure.

5. The method according to claim 3 where the dimensional data (D) for the at least two identified components is updated in an unsupervised training procedure.

6. A control system for controlling a component system depending on the position of a user relative to at least two identified components in the component system, the control system comprising:
   a user-aimed pointing device for interacting with the component system, the pointing device comprising a camera for generating image data representing a target area at which the pointing device is aimed, the target area containing at least part of the at least one component $(C_n)$;
   an image analysis unit configured to analyse the image data to identify the at least two identified components appearing partially or completely in the target area at which the pointing device is being aimed;
   the image analysis unit configured to analyse the image data to determine position information pertaining to a position of the user relative to the at least two identified components and/or the relative positions of the at least two identified components appearing partially or completely in the target area;

a control unit configured to control the component system according to the user position information.

7. The control system according to claim 6 comprising a data acquisition unit configured to acquire dimensional data (D) pertaining to the at least two identified components of the system for use in the image analysis.

8. The control system according to claim 7 comprising a training unit configured to process the acquired dimensional data (D) pertaining to the at least two identified components by:
aiming the pointing device at the at least two identified components;
generating image data representing the at least two identified components;
analysing the image data to derive dimensional data (D') for the at least two identified components; and
updating the acquired dimensional data (D) of the at least two identified components according to the dimensional data (D') derived from the image analysis.

9. The control system according to claim 6 where analysing the image data to determine the user position information comprises application of known dimensional data (D) pertaining to the at least two components.

10. The control system according to claim 9 wherein:
the pointing device is aimed at the at least two components;
image data is generated to represent the at least two components;
the image data is analysed to derive dimensional data (D') for the at least two components;
the known dimensional data (D) is updated for the at least two components according to the dimensional data (D') derived from the image analysis.

11. The control system according to claim 10 where the dimensional data (D) for the at least two components is updated in a supervised training procedure.

12. The control system according to claim 10 where the dimensional data (D) for the at least two components is updated in an unsupervised training procedure.

13. A home entertainment system comprising a plurality of components ($C_1, C_2, \ldots, C_n$) and a control system for controlling at least one function of the home entertainment system depending on the position of a user relative to at least two of the components ($C_1, C_2, \ldots, C_n$), the control system comprising:
user-aimed pointing device configured to interact with the home entertainment system, the pointing device comprising a camera for generating image data representing a target area at which the pointing device is aimed, the target area containing at least part of at least two of the components;
an image analysis unit configured to analyse the image data to identify the at least two components appearing partially or completely in the target area at which the pointing device is being aimed;
the image analysis unit configured to analyse the image data to determine position information pertaining to the position of the user relative to the at least two identified components appearing partially or completely in the target area at which the pointing device is being aimed and/or relative positions of at least two identified components appearing partially or completely in the target area; and
a control unit configured to control the at least one function of the home entertainment system according to the user position information.

14. A lighting system comprising a plurality of components ($C_1, C_2, \ldots, C_n$) and a control system for controlling at least one function of the lighting system depending on the position of a user relative to at least two of the components ($C_1, C_2, \ldots, C_n$), the control system comprising:
a user-aimed pointing device configured to interact with the lighting system, the pointing device comprising a camera for generating image data representing a target area at which the pointing device is aimed, the target area containing at least part of the at least two components;
an image analysis unit configured to analyse the image data to identify the at least two components appearing partially or completely in the target area at which the pointing device is being aimed;
the image analysis unit configured to analyse the image data to determine position information pertaining to the position of the user relative to the at least two identified components appearing partially or completely in the target area at which the pointing device is being aimed and/or relative positions of at least two identified components appearing partially or completely in the target area;
a control unit configured to control the lighting system according to the user position information.

15. A non-transitory computer readable memory comprising any computer readable memory that is not a transitory propagating signal or wave, having stored thereon instructions that when executed cause processing circuitry of a component system to:
aim by the user of a pointing device at a target area containing at least part of at least one component (Cn) of a component system comprising a plurality of components;
generate image data representing the target area at which the pointing device is being aimed;
analyse the image data to identify the at least two components appearing partially or completely in the target area at which the pointing device is being aimed;
analyse the image data to determine position information pertaining to a position of the user relative to the at least two identified components appearing partially or completely in the target area at which the pointing device is being aimed and/or relative positions of at least two components appearing partially or completely in the target area; and
control the component system according to the user position information.

* * * * *